United States Patent [19]

Wilson

[11] 4,142,401
[45] Mar. 6, 1979

[54] GAGE

[76] Inventor: Gardner P. Wilson, 587 S. Hill Ave., Pasadena, Calif. 91106

[21] Appl. No.: 838,914

[22] Filed: Oct. 3, 1977

[51] Int. Cl.² ............................................. G01B 13/12
[52] U.S. Cl. ........................................ 73/37.5; 73/1 J
[58] Field of Search ............... 73/37.5, 204, 3, 1 J; 33/DIG. 2

[56] References Cited

U.S. PATENT DOCUMENTS

| | | | |
|---|---|---|---|
| 2,986,924 | 6/1961 | Becker | 73/37.5 |
| 3,709,035 | 1/1973 | Defries et al. | 73/37.5 X |

Primary Examiner—Richard C. Queisser
Assistant Examiner—Joseph W. Roskos
Attorney, Agent, or Firm—Donald D. Mon

[57] ABSTRACT

A gage for measuring the width of a gap. The gage includes a gaging conduit with an inlet and an outlet. Pressure means supplies gas to the inlet. A hot-wire anemometer is placed in the gaging conduit, and means is responsive to the condition of the anemometer to measure the size of the gap between the outlet of the gaging conduit and the surface as a function of the gas flow rate in the gaging conduit. In a preferred embodiment, a reference conduit is provided which has an inlet and an outlet, and which receives gas under pressure from the pressure source, and a reference orifice through which gas flows when exiting through the reference conduit. A hot-wire anemometer is placed in this reference conduit, the said means being responsive to differences in conditions of the two anemometers.

33 Claims, 5 Drawing Figures

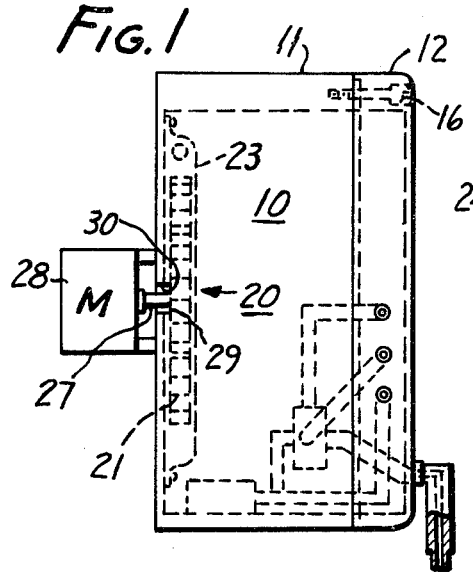
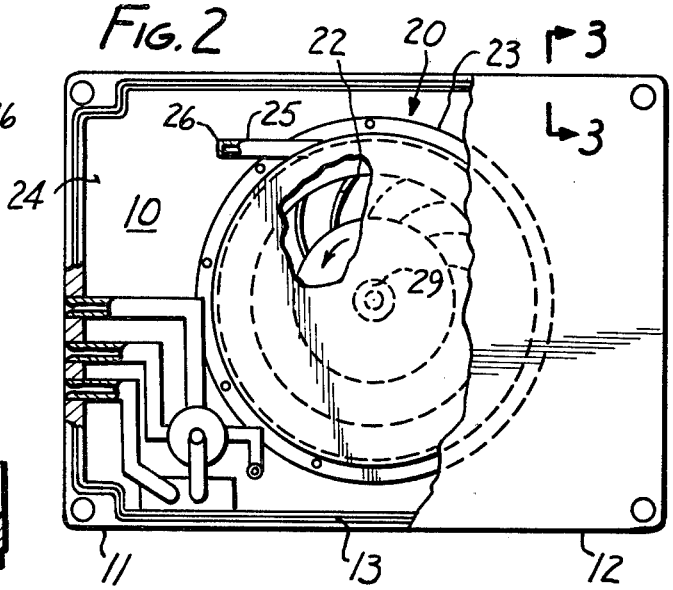
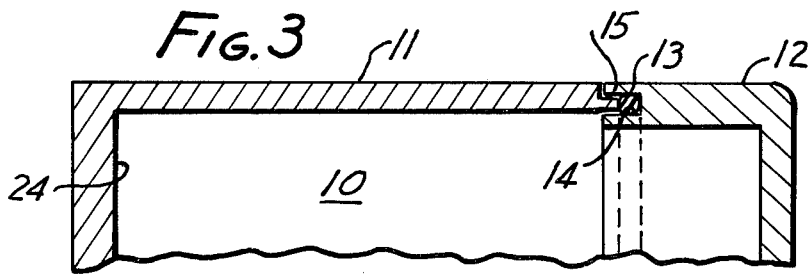
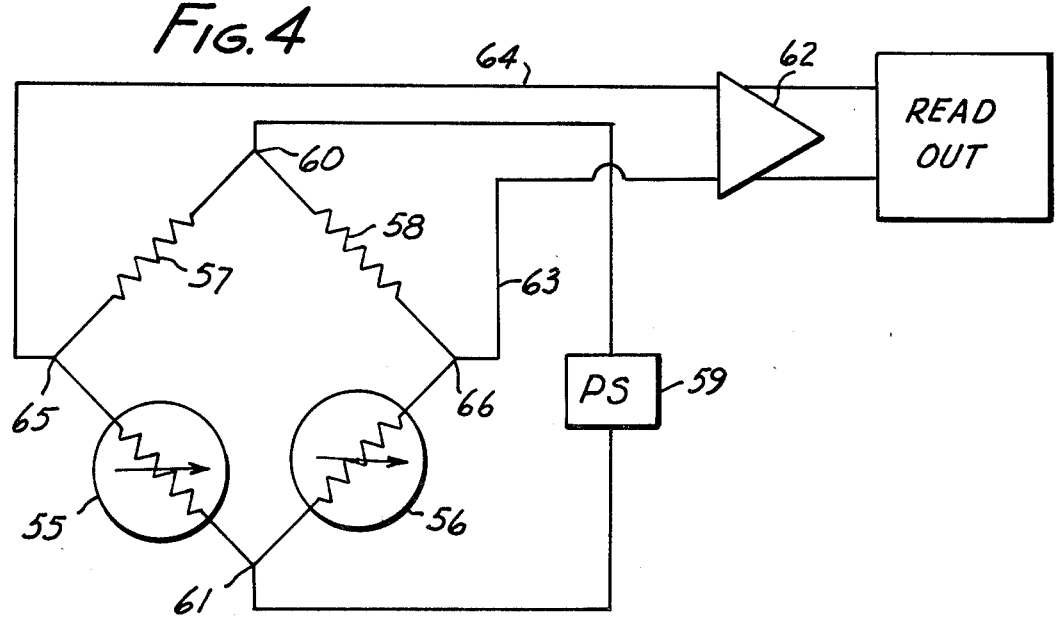

GAGE

This specification relates to gages for measuring the width of a gap. While the gage is sometimes called an "air" gage, its structure can be used with any kind of gas, and whenever the word "air" is used herein, "gas" may be substituted directly for it. An example of another gas is carbon dioxide.

Air gaging is a well-known means for measuring the spacing of a probe from a surface. Classically, this is a non-contact means for measuring small distances. It operates by the partial obstruction of a jet of gas directed toward a surface whose spacing from an air outlet is to be measured.

Air gaging generally operates on the principle that an air jet can be partially blocked by the presence of an object or surface. The percentage of blockage is roughly proportional to the distance from the jet orifice to the object. While the relationship is somewhat non-linear, it is usually sufficiently linear as to be useful. One conventional method for measuring the amount of blockage is to place a pressure gage upstream from the jet, but downstream from a second restriction placed ahead of the jet. This pressure gage can be referenced to atmosphere or to another parallel inactive reference circuit in the manner of a Wheatstone bridge in electricity. The pressure gage is usually a dial-indicating bourdon or diaphragm type. Variations in indications are thereby indicated by the resulting pressure shown on the gage dial, which can be calibrated in units of length.

The above system suffers from slowness in response. Changing the spacing is not immediately reflected by the pressure gage, because the volumes in the circuit need to be filled with gas in order to rise to a new value of pressure. These volumes are integrators, and result in a slow response.

Another type of compressed air gaging utilizes measurement of flow instead of pressure. The flow is usually measured with a tapered glass column with a small floating indicator that moves up and down, and a scale. This is the classical "flowmeter" system.

Both of these systems have been in use for many years and are still in use today. They use rather high pressure, about 20 psig, because their sensitivity is a direct function of pressure. They suffer from annoyances in the air supply which arise from plugging due to oil, water, rust and dirt. Also in large shops, the source of air pressure can vary due to usage by others. Further, these systems require direct visual readout by the operator. If an electrical readout is desired for charting or recording, or for a computer, then an additional transducer must be added. In addition, their total measuring range is rather restricted being on the order of about 0.002 inches for small diameter jets because of the non-linear behavior of the jet blockage versus the distance to be measured. These systems are required to operate over only a small part of their curve in order to minimize their non-linear errors.

All air gaging systems suffer from the fact that the viscosity of air varies with its temperature, causing the amplification to vary with temperature. As the temperature of air increases, it becomes more viscous, and the amount of air flowing out of the jet decreases. This can result in errors in reading unless compensation steps are taken, or unless correction factors are added.

It is an object of this invention to provide an air gaging system which overcomes many of the limitations indicated above. In this device no external compressed air source is required. Because the air pressure utilized is only on the order of about 1/0000 the pressure of usual compressed air systems, and such a small quantity is used, a small, local, quiet centrifugal blower or other readily portable supply such as a gas cartridge can be used. The resulting air flow is utilized in the so-called noncompressible aerodynamic regime. Under these circumstances, the conduitry involved is always filled with gas, and little if any change in pressure occurs. The gas behaves very much as a liquid does. Therefore, flow response upstream is immediate relative to what occurs downstream, and there is extremely rapid response.

Another objective of the invention is to provide a signal which is electrical and can easily be coupled directly to analog or digital meters or the like, without requiring adaptive or interface equipment.

Yet another object of this invention is to provide a device which can readily be linearized by electronic techniques so that the measuring range of the system can be extended at least double that of past systems, or to a total range of approximately 0.004 inches for a small jet.

It is another object of this invention to provide calibrating devices in such a system.

It is still another object of this invention to provide convenient means to compensate for changes in temperature and viscosity.

An air gage according to this invention includes a pressure means for supplying gas (for example, air) under pressure. A gaging conduit has an inlet and an outlet. The inlet receives the gas, and the outlet discharges it to a region of lower pressure, usually to atmosphere. A hot-wire anemometer is placed in the gaging conduit, and means responsive to the condition of the anemometer measures the size of the gap between the outlet of the gaging conduit and a surface as a function of gas flow rate in the gaging conduit.

Accordng to a feature of the invention, the pressure means maintains the gas pressure at such a pressure that the air flow is in the non-compressible aerodynamic regime.

According to a preferred but optional feature of the invention, a reference conduit is supplied which has an inlet and an outlet. Its inlet receives gas from the same pressure means, and its outlet discharges to the same region as the outlet of the gaging conduit. The reference conduit includes a reference orifice through which the gas flows. A hot-wire anemometer is provided in the reference conduit, and the said means compares the condition of the two anemometers.

The above and other features of this invention will be fully understood from the following detailed description and the accompanying drawings in which:

FIG. 1 is a side view of part of an instrument according to the invention;

FIG. 2 is a right hand view of FIG. 1;

FIG. 3 is a fragmentary cross-section view taken at line 3—3 in FIG. 2;

FIG. 4 is a schematic circuit diagram showing a portion of the system; and

Figure 5:
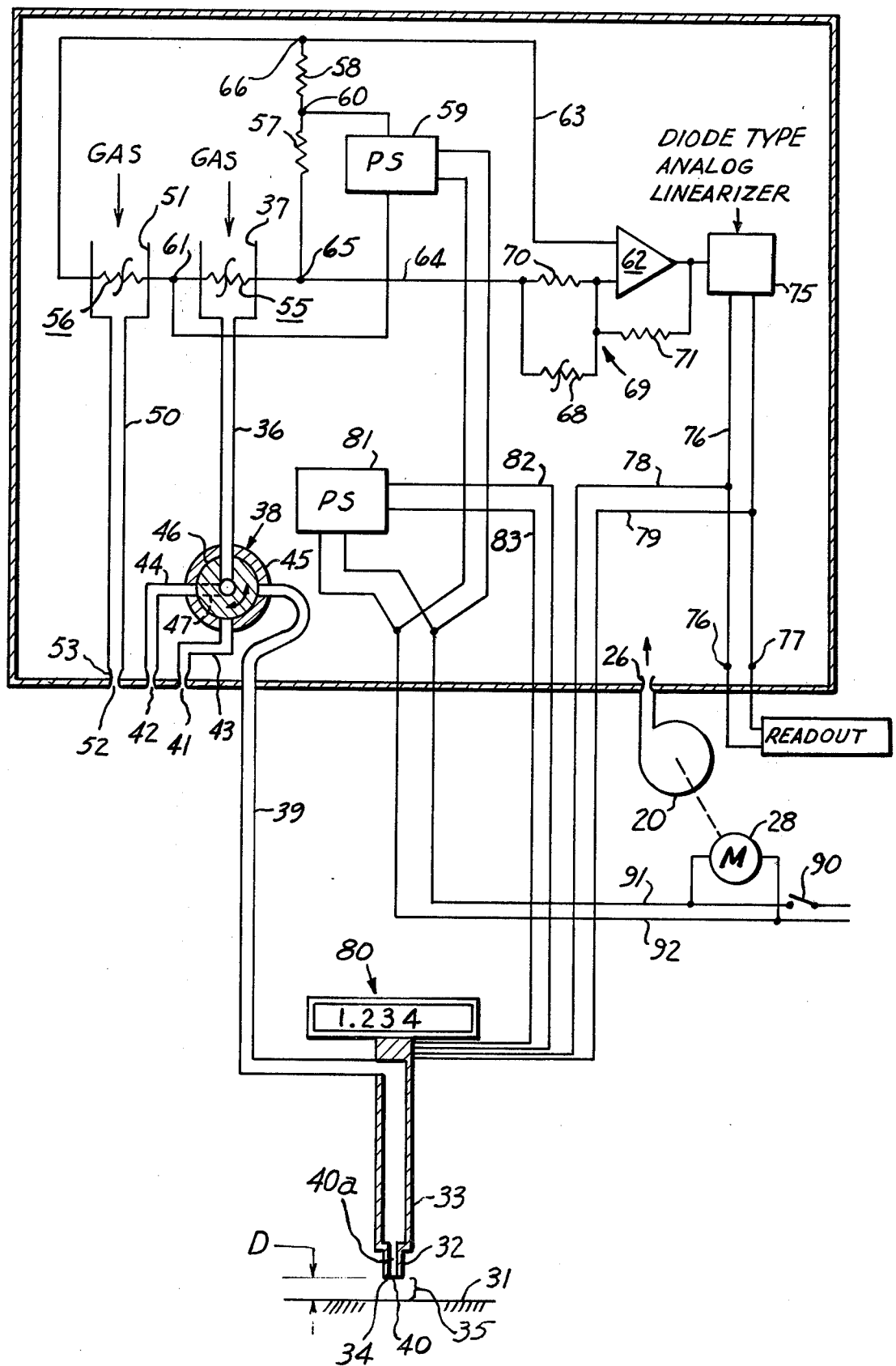
FIG. 5 is a schematic view showing the entire system according to the invention.

The presently preferred embodiment of the invention, and also its best mode, is shown in FIG. 1. This embodiment includes a plenum chamber 10 which is formed as a cavity in a box comprising a first part 11 and a second part 12. Part 11 is in the nature of a box "bottom," and part 12 is in the nature of a box lid. A peripheral seal 13 is seated in a peripheral groove 14 in part 12 and pressed against by a peripheral lip 15 on part 11 to seal the plenum at the joinder of the two parts. Gas flow into and out of the plenum chamber occurs only through openings and clearances which are yet to be described. The two parts are held together by headed bolts 16 which pass through holes in part 12 and are threaded into receptacles in part 11. The heads of the bolts bear against part 12.

Pressure means 20 comprises a small centrifugal blower 21 comprising a multiple-bladed rotor mounted for rotation inside a cover 23 that is sealed to and mounted to the back face 24 of part 11. A tube 25 passes through cover 23 and includes an orifice 26 through which air propelled by the rotor discharges into plenum chamber 10 under pressure developed by pressure means 20.

The rotor is mounted to a shaft 27 which is driven by an electrical motor 28. The motor is mounted to the backside of face 24, outside of the plenum chamber. There is a clearance 29 between shaft 27 and a hole 30 in face 24 through which the shaft passes. This clearance provides for air intake to the centrifugal blower. Accordingly, gas flow into the plenum chamber is through clearance 29, from the centrifugal blower through tube 25, through orifice 26, and into plenum chamber 10.

Motor 28 is either a synchronous motor, or a lightly loaded induction motor (which is lss expensive than a synchronous motor). Such motors will operate at or near synchronous speeds, and the output pressure of the pressure source thereby remains sensibly constant. A pressure regulator is therefore not needed, especially at the low pressures used in this instrument.

This operation of blower 21 will cause an air (gas) pressure to be supplied to the plenum chamber. The effect of orifice 26 operating in combination with the plenum chamber volume is to smooth out high-frequence pressure variations in the air supply created by local turbulences from the blower blades. The size of the plenum chamber may be on the order of ⅛th cubic foot. With an orifice 26 having a diameter of about 0.026 inches diameter, this will give a time constant of about 1 second, which effectively filters out high frequency pressure variations.

The plenum is optional, and is provided as a filter. Also, instead of being formed as a cavity directly by the outer case of the instrument, it could instead be formed by a separate box enclosed in a case. Many sealing problems are avoided by such an arrangement.

As can best be seen in FIG. 5, the object of this invention is to measure a dimension D between a surface 31 and tip 32 of probe 33. The probe terminates in a flat smooth end surface 34. The effect is to form a variable orifice 35 between end surface 34 and surface 31.

As can best be seen in FIGS. 1, 2 and 5, a gaging conduit 36 has an inlet 37 receiving gas under pressure from the pressure means. The inlet is inside the plenum chamber, and gas will flow through conduit 36 toward a lower pressure, for example toward atmosphere. The gaging conduit extends to a selector valve 38 which can direct the upstream portion of the gaging conduit to one of several destinations, or close it entirely. The primary destination is to a continuation 39 of the gaging conduit leading to tip 32 of the probe. Gas exits the gaging conduit through an outlet 40 in surface 34. An orifice 40a is located immediately upstream from outlet 40, and in fact the outlet is ordinarily the downstream end of orifice 40a.

An advantage of this embodiment is that it provides for easy calibration by the use of orifices 41, 42 which may be of such sizes as to be representative of respective known spacings at the robe. The readout can be adjusted to read these respective values when the selector valve is set to discharge gas through these orifices instead of through the probe. For example, orifice 41 might be indicative of a 0.001" spacing, and orifice 42 of a 0.0005" spacing. The "off" position can simulate total closure, i.e., flat contiguity of surfaces 34 and 31. Then a comparison with this zero value can tell the user when his probe is normal to the surface being gaged. This is an advantage not found in known ages, wherein it is difficult to align the probe normal to the other surface.

A first calibration conduit 43 and a second calibration conduit 44 lead to respective calibration orifices 41 and 42, and are respectively connected to ports in body 45 of rotary selector valve 38. A rotor 46 controls the setting of the selector valve. It includes a distributor port 47 which is always connected to the upstream portion of gaging conduit 36, and which is selectively connectable to any of conduits 39, 43 or 44, or to none of them. Both orifices 41 and 42 are mounted in the wall of the plenum chamber and are sealed to their respective calibration conduits to provide a path for exit of gas from the plenum chamber when the selector valve connects the gaging conduit to them.

A reference conduit 50 has an inlet 51 which receives gas from the pressure means inside the plenum, and an outlet 52 through the wall of the plenum chamber. The reference conduit includes a reference orifice 53. Gas entering and exiting the plenum chamber through the reference conduit flows into inlet 51, through orifice 53, and out outlet 52 to atmosphere. Outlet 52 is usually the downstream end of orifice 53.

A first hot-wire anemometer 55 is placed in gaging conduit 36. A second hot-wire anemometer 56 is placed in the reference conduit.

These anemometers comprise identical thin wires which are resistance heated by electricity, and whose resistance is proportional to their temperature. With a constant flow of electricity through them, their resistance will be determined by their temperature, and their temperature will be a function of the rate of gas flow over them.

A hot-wire anemometer is defined as a resistance element, whose resistance varies with its temperature, which is heated by current flowing through it and cooled by gas flowing over it. It is not limited to cylindrical wires. This generic term includes spiral shapes, blobs, plates, sheets, cylinders through which the air flows, and in general any structure with the foregoing functions.

It will be seen that the rate of gas flow past the hot-wire anemometer will be directly measured by the temperature of the wire under operating conditions. There will now be described a means to utilize this feature.

A convenient means responsive to the condition of the anemometer is an electronic system such as a Wheatstone bridge. An example is schematically shown in FIG. 4. FIG. 4 shows only a portion of the device of FIG. 5 and is intended to facilitate an understanding of FIG. 5. Reference should be made to FIG. 5 for an understanding of the total system.

In FIG. 4, the two hot-wire anemometers are shown, and also a pair of fixed value resistors 57, 58. A power supply 59 is connected to connections 60, 61, and an amplifier 62 is connected by leads 63, 64 to connections 65, 66 between anemometer 55 and resistor 57, and between anemometer 56 and resistor 58, respectively. A readout 67 receives its signal from the amplifier. Power supply 59 also serves to heat the hot-wires of the anemometers.

This is a convenient technique for measurement of the effects on the anemometers when both are used. As will later be described, with a simple modification, this circuit may also be used when only one anemometer is utilized.

Compensation for ambient temperature change is accomplished by providing a temperature-sensitive resistor 68 in the gain-determining circuit 69 of amplifier 62. Resistor 68 is exposed to gas in the plenum chamber, and is at the same temperature as the gas. Compensation is accomplished by resistor 68 in combination witth a dropping resistor 70 and a feedback resistor 71, all in a manner generally understood in the electronic arts. Change in resistance of resistor 68 will change the gain of the amplifier, and compensate the ultimate outputt for a too large or too small output which would result from less viscosity at lower temperatures and more viscosity at higher temperatures. The degree of compensation is a function of the resistance ratios of resistors 70 and 68.

A linearizer 75 is schematically shown in the drawings. This device is a generally known analog type device which compensates a non-linear function such as a curve to a linear shape by changing the amplification of the amplifier in an amount respective to the non-linearity of a given reading. By using such a device along with the amplifier, a signal which does not depart too radically from linear can be compensated, and in this device the measuring range can be extended from about 0.002" to about 0.004 inches. Examples of suitable circuitry will be found in the "Nonlinear Circuits Handbook" published in 1974 by Analog Devices, Inc. Norwood, Mass. 02062, pages 52–55 and 93–97.

The signal from the amplifier (or from the anemometer if no amplifier is used) is applied to the optional linearizer, which in turn applies its output signal to terminals 76 and 77 to which any electrical readout device can be connected, for example a pointer-type meter, or a pen-chart device, or other recorder. These terminals could instead have been connected directly to the Wheatstone bridge, or to the anemometers, as desired, should neither amplification nor linearization be desired.

A digital visual readout 80 can be supplied on the probe. It requires its own power supply 81, applied through leads 82, 83. Leads 78 and 79 apply the signal to this readout device. Adjustment means (not shown) are provided to adjust the readout means to a number reflective of the condition defined by the calibration conduits when used. These simply adjust the base value of the readout. An analog meter may also be used at the probe, requiring no extra power supply.

House current, usually 115 volts, is applied through switch 90 and leads 91 and 92 to the motor and to the power supply.

It is essential to an understanding of this invention to realize that this gage is a "small velocity" type. In fact, the amount of air used is so small, and its movement so slow, that its inventor casually characterizes it as an "airless" air gage for this reason, as well as for the reason that it uses so little air it is independent of fixed or major air sources. The anemometer wires should be and usually are very small — they are usually circular, and their diameters should not exceed about 0.00004 inches in diameter. Their length is usually on the order of about 0.1 inches. They are made of platinum. It is evident that the ratio of the surface area to their volume is very large. Therefore their temperature response will be quite rapid. Heavier wires or other structure for the "hot-wire" may be used if a more sluggish response is tolerable.

The preferred small wires are quite fragile, and rapid gas streams could destroy them. For this and other reasons, it is best to maintain the air stream at a relatively small differential pressure, with not only a low velocity, but also a rather small change in pressure. At these slow rates, and small differential pressure relative to atmosphere, the gas stream will not harm the wire, nor "swamp" its capacity to reflect the flow rate. Also, it behaves as an incompressible liquid (i.e., in the non-compressible aerodynamic mode). A change in condition downstream is communicated at the speed of sound, and it is unnecessary to supply gas to change pressure to provide a signal. This device therefore operates with a "full" conduit at all times. It follows that temperature change in the anemometer is very closely coupled to the rate of flow of fluid discharge from the conduits, both as to time and to quantative response, and the device is durable.

In order for the above to be optimal, the flow should be "small," i.e., on the order of 2 to 3 cm $^{3/}$second or less, with a linear rate of flow past the anemometer not greater than about 2 cm/sec, and with a differential pressure not appreciably greater than about 0.5 inches of water. Such a seemingly slow condition is in fact, and surprisingly, very quickly and sensitively responsive to flow conditions at the probe.

Especially when combined with an amplifier, the signal from the hot-wire anemometer can provide an exceptionally useful gage. It can be remarkably improved by a linearizer, because its range can be extended. The amplifier and linearizer are, however, optional.

It should also be understood that, while it is useful to and best practice to have both a reference conduit and a gaging conduit, the system can be used with only a gaging conduit. The only modification required in order to use the circuit of FIG. 5 is to substitute a fixed resistor for the second hot-wire anemometer, eliminating the reference conduit entirely.

It will also be understood that other electronic and circuit techniques may be proved for reading out the condition of the anemometers. The specific circuit configuration does not form an essential part of the invention.

In operation, switch 90 is closed to start the motor in operation. After only a very brief time, the plenum chamber reaches the operating pressure, with gas flowing wherever the selector valve setting dictates, or closed. To calibrate the device, the selector valve is connected to couple the upstream position of gaging conduit 36 to the appropriate one of the calibration conduits 43, 44, and the readout is adjusted to indicate a number respective to that setting. This enables a very quick setup to be made.

Then for measurement, the selector valve is set so as to make a through connection of conduit 36 to its continuation 39, and the gap dimension can readily be measured.

The condition of the anemometer in the reference conduit will be substantially constant, but it responds to perturbations in the gas supply simultaneously with the anemometer in the gagingg conduit, and it will tend to compensate for these perturbations, leaving a "net change" to be detected and measured by the anemometer in the gaging conduit. Therefore, a reference conduit is a convenient thing to use.

Both of the hot-wires are heated, and the power supply will supply direct current to both of them, both for heating and for reference purposes. In the manner of a Wheatstone bridge, a voltage difference will appear at connections 65 and 66 which difference is fed to amplifier 62. The amplifier has an optional temperature calibration in its grain-determining circuit, which compensation will increase the amplification by exactly the correct amount to compensate for the reduction or increase of flow through the orifice as a function of viscosity increase or decrease with increase or decrease in temperature. The output from the amplifier is applied to the linearizer, which corrects for non-linearity and the resulting signal is provided to whatever form of readout is utilized.

The term "pressure means" is used to define whatever source supplies gas under pressure to the conduits. The blower shown is ideally inexpensive and trouble free. Because its rotor contributes a high-frequency variation to the pressure, the orifice and the plenum chamber are provided. However, stable or regulated sources could be used instead, and then orifice 26 and plenum chamber 10 would not be required. For example, a pressurized gas cartridge with a reducer valve and regulator valve is useful, as is a diaphragm pump, or a simple long-stroke piston and cylinder. The output of these sources need not be "smoothed" by a plenum and orifice, and could be directly supplied to the gaging conduit and also to the reference conduit. Therefore, the plenum chamber is an optional feature to reduce perturbations in the air flow by acting as filter and "smoothing" device.

When a plenum is not utilized, the pressure means supplies gas directly to the inlet of the gaging conduit and, when a reference conduit is used, also to its inlet.

It is possible to double to responsiveness of this gage by providing two instead of one hot wire anemometers in the gaging conduit, and forming them as opposite (not adjacent) arms of the Wheatstone bridge. The same air flow thus does "double duty."

This invention thereby provides an inexpensive, simple, and rugged device which can accurately measure an air gap, which has self calibration means, which uses very little energy, and which wastes even less.

This invention is not to be limited by the embodiments shown in the drawings and described in the description which are given by way of example and not of limitation, but only in accordance with the scope of the appended claims.

I claim:

1. A gage for measuring the width of a gap, said gage comprising: a gaging conduit having an inlet and an outlet; pressure means supplying gas under pressure to the inlet of the gaging conduit, said pressure means maintaining the gas pressure at such a value that gas flow through the gaging conduit is in the non-compressible aerodynamic regime, said gaging conduit exhausting gas to a region of lower pressure; a hot-wire anemometer in the gaging conduit; and means responsive to the condition of the anemometer conduit to measure the size of the gap between the outlet of the gaging conduit and a surface as a function of gas flow rate in the gaging conduit.

2. A gage according to claim 1 in which the pressure means supplies gas at a pressure of about 0.5 inches of water.

3. A gage according to claim 1 in which the anemometer, which is placed in the path of air flow through the gaging conduit, includes a resistance element adapted to be heated, the ratio of surface area to volume of said resistance element being relatively large.

4. A gage according to claim 3 in which the resistance element is a circular wire, whose diameter is no greater than about 0.00004 inches.

5. A gage according to claim 4 in which the pressure means supplies gas at a pressure of about 0.5 inches of water.

6. A gage according to claim 1 in which further includes a calibration conduit connectible to the gaging conduit downstream from the anomometer, a calibration orifice in said gaging conduit, and selector means for selectively connecting the inlet of the gaging conduit to the outlet or to the calibration conduit.

7. A gage according to claim 1 in which said means comprises an amplifier amplifying a signal from the anemometer, and readout means which provide visual indication of the value of said signal.

8. A gage according to claim 7 in which the amplifier includes a gain-determining circuit, which in turn includes a temperature-sensitive circuit element that adjusts the gain of the amplifier to compensate for temperature-caused viscosity changes.

9. A gage according to claim 7 in which the output signal from the amplifier is applied to a linearizer which compensates said signal for non-linearity as a function of the value of the signal.

10. A gage according to claim 9 in which the amplifier includes a gain-determining circuit, which in turn includes a temperature-sensitive circuit element that adjusts the gain of the amplifier to compensate for temperature-caused viscosity changes.

11. A gage according to claim 1 in which a reference conduit having an inlet, an outlet and a reference orifice, receives gas from the same pressure source and discharges to the same region as the gaging conduit, and in which a second hot-wire anemometer is placed in said reference conduit, exposed to gas flow therein, and wherein said means is responsive to the condition of both anemometers.

12. A gage according to claim 11 in which said means comprises an amplifier amplifying a signal derived from the two anemometers.

13. A gage according to claim 12 in which said means includes a wheatstone bridge circuit, each of said anemometers being disposed in a respective arm thereof.

14. A gage according to claim 1 in which the pressure means comprises a rotary blower.

15. A gage according to claim 14 in which the blower has a rotor with a plurality of blades.

16. A gage according to claim 1 in which two hot-wire anemometers are placed in the gaging conduit, and in which the responsive means includes a Wheatstone bridge circuit, the said two hot-wire anemomenters being connected in opposite arms of the bridge circuit.

17. A gage according to claim 1 in which the linear rate of flow past the anemometer is not greater than about 2cm/sec and the pressure means supplies gas at a pressure which is not appreciably greater than about 0.5 inches of water.

18. A gage for measuring the width of a gap said gage comprising: a plenum change; pressure means maintaining gas in the plenum change under pressure; a reference conduit having an inlet in the plenum chamber, an outlet exhausting gas outside the plenum chamber, and a reference orifice through which the gas flows when exiting the plenum chamber through the reference conduit; a gaging conduit having an inlet in the plenum chamber and an outlet exhausting gas outside the plenum chamber through which gas flows when exiting the plenum chamber through the gaging conduit, said pressure means maintaining the gas pressure at such a value that gas flow through the gaging and reference conduits is in the non-compressible aerodynamic regime, a first hot-wire anemometer in the gaging conduit; a second hot-wire anemometer in the reference conduit; and means responsive to the condition of both of said anemometers in their respective conduits to measure the size of the gap between the outlet of the gaging conduit and a surface as a function of gas flow rate in the gaging conduit compared to gas flow rate in the reference conduit.

19. A gage according to claim 18 in which the anemometers are connected in a wheatstone bridge circuit as individual arms thereof.

20. A gage according to claim 18 in which the pressure means supplies gas at a pressure of about 0.5 inches of water.

21. A gage according to claim 18 in which the pressure means comprises a blower and a restrictive orifice disposed between said blower and said plenum chamber.

22. A gage according to claim 21 in which the plenum chamber is formed in a box-like structure, and in which the blower is disposed inside the structure.

23. A gage according to claim 18 in which the anemometer, which is placed in the path of air flow through the gaging conduit, includes a resistance element adapted to be heated, the ratio of surface area to volume of said resistance element being relatively large.

24. A gage according to claim 23 in which the resistance element is a circular wire, whose diameter is no greater than about 0.00004 inches.

25. A gage according to claim 18 in which further includes a calibration conduit connectible to the gaging conduit downstream from the anemometer, a calibration orifice in said gaging conduit, and selector means for selectively connecting the inlet of the gaging conduit to the outlet or to the calibration conduit.

26. A gage according to claim 18 in which said means comprises an amplifier amplifying a signal from the anemometer, and readout means which provide visual indication of the value of said signal.

27. A gage according to claim 26 in which the amplifier includes a gain-determining circuit, which in turn includes a temperature-sensitive circuit element that adjusts the gain of the amplifier to compensate for temperature-caused viscosity changes.

28. A gage according to claim 18 in which the pressure means comprises a rotary blower.

29. A gage according to claim 28 in which the blower has a rotor with a plurality of blades.

30. A gage according to claim 18 in which two hot-wire anemometers are placed in the gaging conduit, and in which the responsive means includes a Wheatstone bridge circuit, the said two hot-wire anemometers being connected in opposite arms of the bridge circuit.

31. A gage according to claim 18 in which the linear rate of flow past the anemometer is not greater than about 2cm/sec and the pressure means supplies gas at a pressure which is not appreciably greater than about 0.5 inches of water.

32. A gage for measuring the width of a gap, said gage comprising: a gaging conduit having an inlet and an outlet; pressure means supplying gas under pressure to the inlet of the gaging conduit, said gaging conduit exhausting gas to a region of lower pressure; a hot-wire anemometer in the gaging conduit; means responsive to the condition of the anemometer conduit to measure the size of the gap between the outlet of the gaging conduit and a surface as a function of gas flow rate in the gaging conduit; a calibrtion conduit connectible to the gaging conduit downsteam from the anemometer; a calibration orifice in said gaging conduit; and selector means for selectively connecting the inlet of the gaging conduit to the outlet or to the calibration conduit.

33. A gage for measuring the width of a gap, said gage comprising: a plenum chamber; pressure means maintaining gas in the plenum chamber under pressure; a reference conduit having an inlet in the plenum chamber, an outlet exhausting gas outside the plenum chamber, and a reference orifice through which the gas flows when exiting the plenum chamber through the reference conduit; a gaging conduit having an inlet in the plenum chamber and an outlet exhausting gas outside the plenum chamber through which gas flows when exiting the plenum chamber through the gaging conduit; a first hot-wire anemometer in the gaging conduit; a second hot-wire anemometer in the reference conduit; means responsive to the condition of both of said nemometers in their respective conduits to measure the size of the gap between the outlet of the gaging conduit and a surface as a function of gas flow rate in the gaging conduit compared to gas flow rate in the reference conduit; a calibration conduit connectible to the gaging conduit downstream from the anemometer; a calibration orifice in said gaging conduit; and selector means for selectively connecting the inlet of the gaging conduit to the outlet or to the calibration conduit.

* * * * *